United States Patent
Briscoe

(10) Patent No.: US 9,344,368 B2
(45) Date of Patent: May 17, 2016

(54) DETERMINING PATH CONGESTION MEASURES

(75) Inventor: Robert J. Briscoe, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 111 days.

(21) Appl. No.: 14/130,153

(22) PCT Filed: Jun. 29, 2012

(86) PCT No.: PCT/GB2012/000562
§ 371 (c)(1),
(2), (4) Date: Dec. 30, 2013

(87) PCT Pub. No.: WO2013/001271
PCT Pub. Date: Jan. 3, 2013

(65) Prior Publication Data
US 2014/0140234 A1      May 22, 2014

(30) Foreign Application Priority Data

Jun. 30, 2011   (EP) .................................... 11250620
Dec. 20, 2011   (GB) .................................... 1122006.8

(51) Int. Cl.
*H04L 12/801* (2013.01)
*H04L 12/825* (2013.01)
*H04L 12/833* (2013.01)

(52) U.S. Cl.
CPC .............. *H04L 47/11* (2013.01); *H04L 47/17* (2013.01); *H04L 47/18* (2013.01); *H04L 47/193* (2013.01); *H04L 47/26* (2013.01); *H04L 47/31* (2013.01)

(58) Field of Classification Search
None
See application file for complete search history.

(56) References Cited

U.S. PATENT DOCUMENTS

| 7,734,808 | B1* | 6/2010 | Bergamasco et al. ......... 709/235 |
| 2007/0115814 | A1* | 5/2007 | Gerla et al. .................... 370/230 |
| 2007/0133419 | A1* | 6/2007 | Segel ............................ 370/236 |

(Continued)

FOREIGN PATENT DOCUMENTS

| WO | WO 2005/109783 | 11/2005 |
| WO | WO 2010/045553 | 4/2010 |

(Continued)

OTHER PUBLICATIONS

International Search Report for PCT/GB2012/000562 mailed Oct. 2, 2012.

(Continued)

*Primary Examiner* — Benjamin H Elliott, IV
(74) *Attorney, Agent, or Firm* — Nixon & Vanderhye P.C.

(57) ABSTRACT

Downstream path congestion is measured in respect of a node via which a plurality of data units are traversing an end-to-end path from a sender to a receiver. Each data unit has a first indication settable in dependence on information from the receiver to each of at least two states whereby to indicate different levels of congestion experienced on the end-to-end path by data units previously received by the receiver, and a second indication settable to an initial state and to at least one updated state indicative of congestion experienced by data units on their path from the sender to said node. A plurality of data units are received at the node, and the downstream path congestion measure is determined in dependence on an inflation factor itself dependent on the proportion of a set of the data units whose second indication on receipt at the node is in the initial state.

27 Claims, 6 Drawing Sheets

Process for measuring downstream congestion from superimposed encodings

(56) References Cited

U.S. PATENT DOCUMENTS

| | | |
|---|---|---|
| 2008/0130502 A1 | 6/2008 | Charny et al. |
| 2008/0198746 A1* | 8/2008 | Kwan et al. .................. 370/231 |
| 2009/0059816 A1* | 3/2009 | Reza et al. .................. 370/256 |
| 2009/0113069 A1* | 4/2009 | Prabhakar et al. ............ 709/235 |
| 2009/0279433 A1* | 11/2009 | Briscoe .............. H04L 12/2602 370/235 |
| 2011/0205895 A1* | 8/2011 | Chen et al. .................. 370/231 |
| 2012/0016986 A1* | 1/2012 | Jacquet et al. ............... 709/224 |
| 2012/0051216 A1* | 3/2012 | Zhang .................... H04L 47/12 370/230 |
| 2012/0236715 A1* | 9/2012 | Vitt et al. ..................... 370/230 |
| 2012/0257505 A1* | 10/2012 | Kutscher ................ H04L 47/20 370/235 |
| 2013/0010598 A1* | 1/2013 | Ludwig et al. ............... 370/235 |
| 2013/0294244 A1* | 11/2013 | Fujita et al. .................. 370/235 |
| 2014/0140234 A1* | 5/2014 | Briscoe ................. H04L 47/18 370/252 |

FOREIGN PATENT DOCUMENTS

| | | |
|---|---|---|
| WO | WO 2010/106311 | 9/2010 |
| WO | WO 2011/085344 | 7/2011 |
| WO | WO 2011/106288 | 9/2011 |

OTHER PUBLICATIONS

Written Opinion for PCT/GB2012/000562 mailed Oct. 2, 2012.
Search Report for EP 11250620.9, dated Dec. 28, 2011.
Search Report for GB 1122006.8, dated Apr. 13, 2012.
Briscoe "Re-feedback: Freedom with Accountability for Causing Congestion in a Connectionless Internetwork", Retrieved from the internet: URL:http??citeseerx.ist.psu.ed/viewdocs, May 15, 2009, 256 pgs.

* cited by examiner

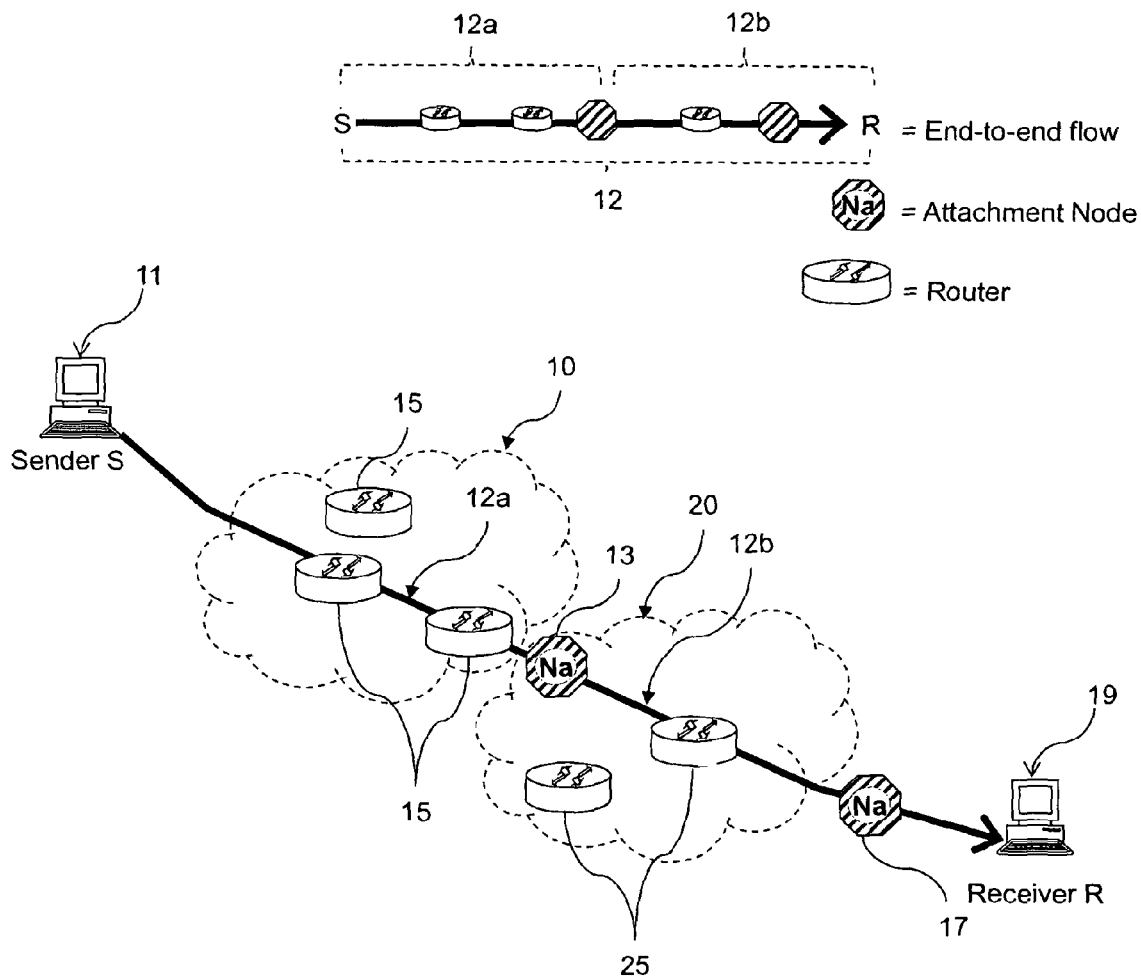
Figure 1 - Schematic of typical network

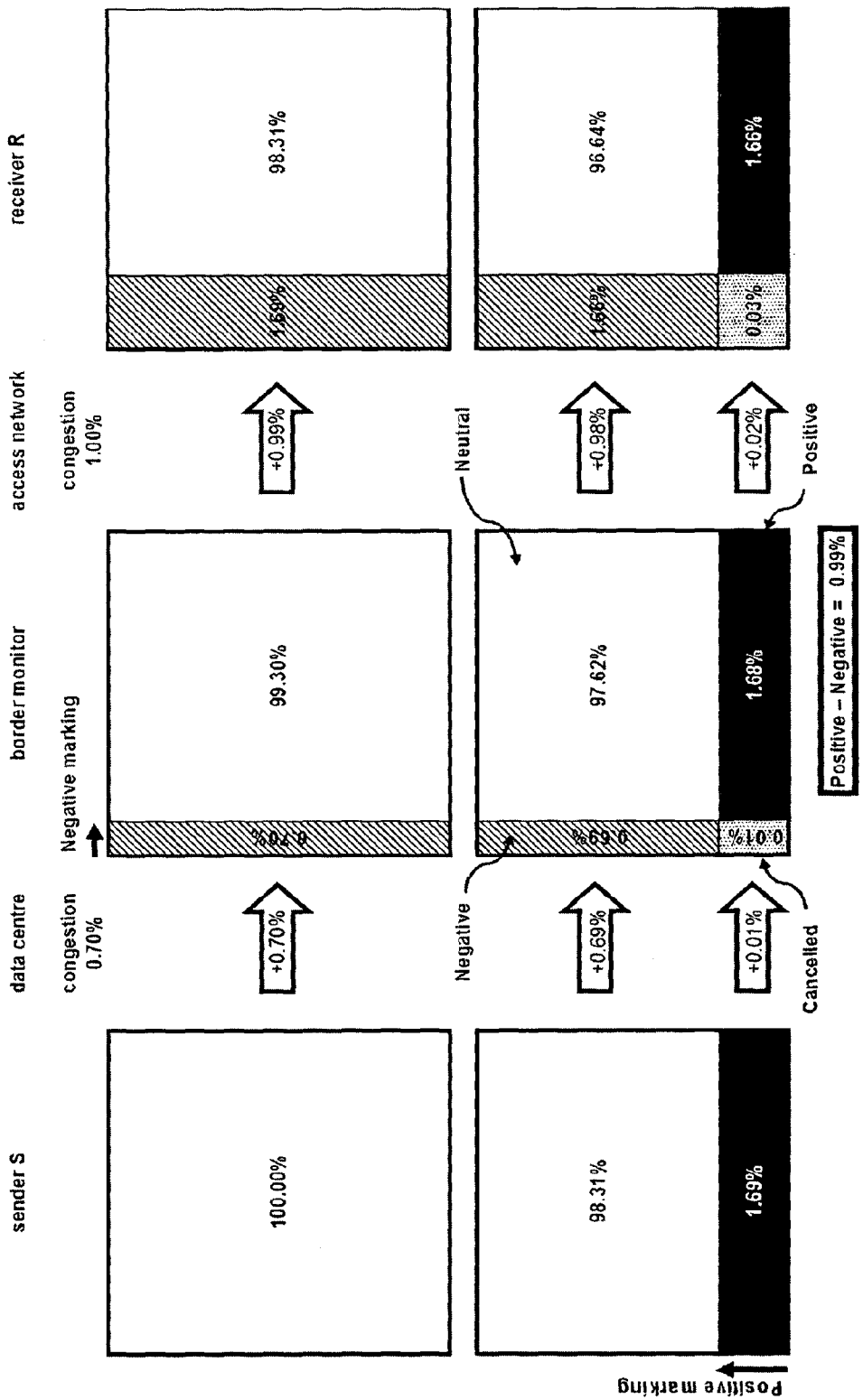
Figure 2 – Measuring downstream congestion with the Re-ECN protocol

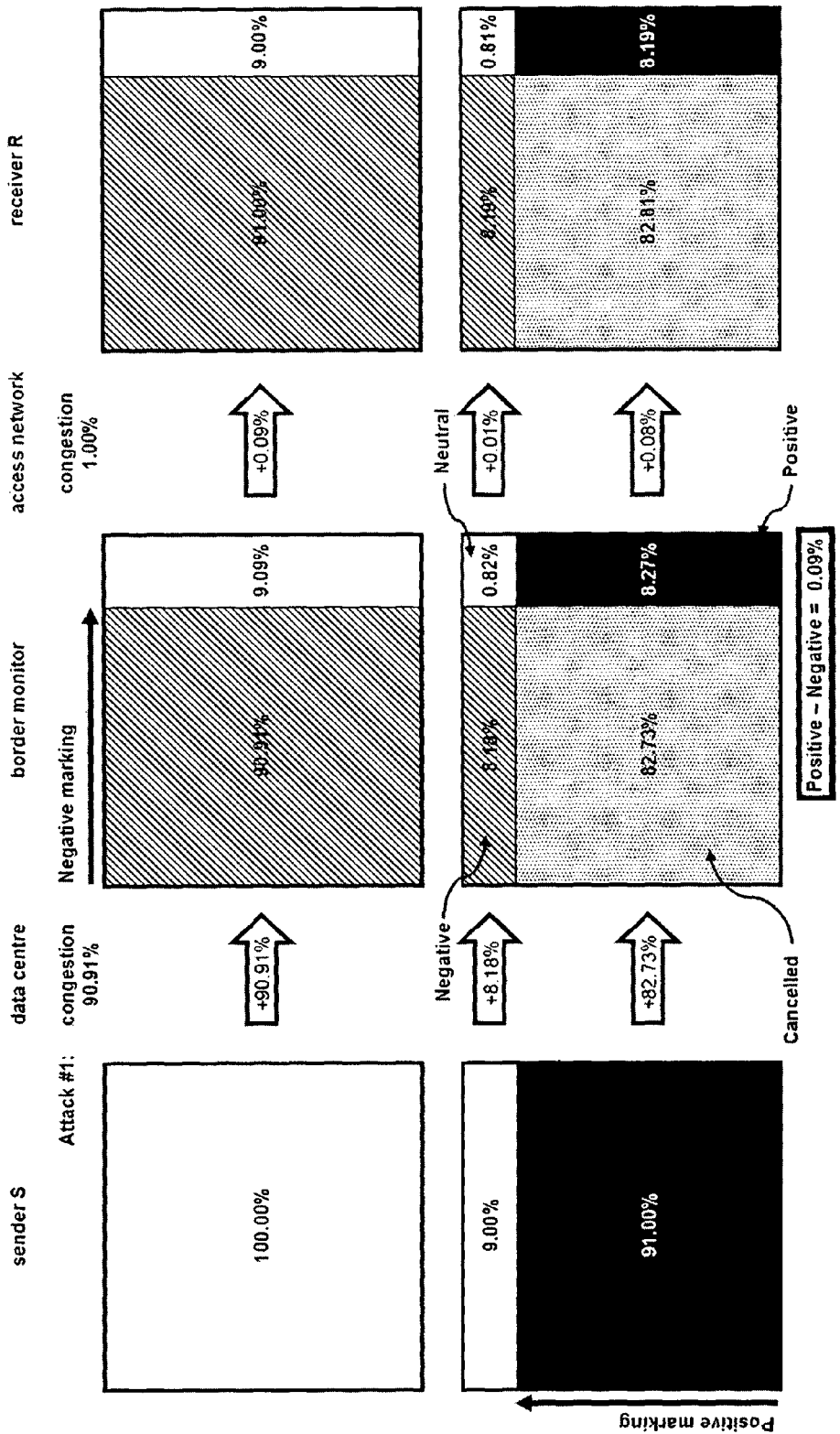
Figure 3 – Attack #1: Extreme Upstream Congestion

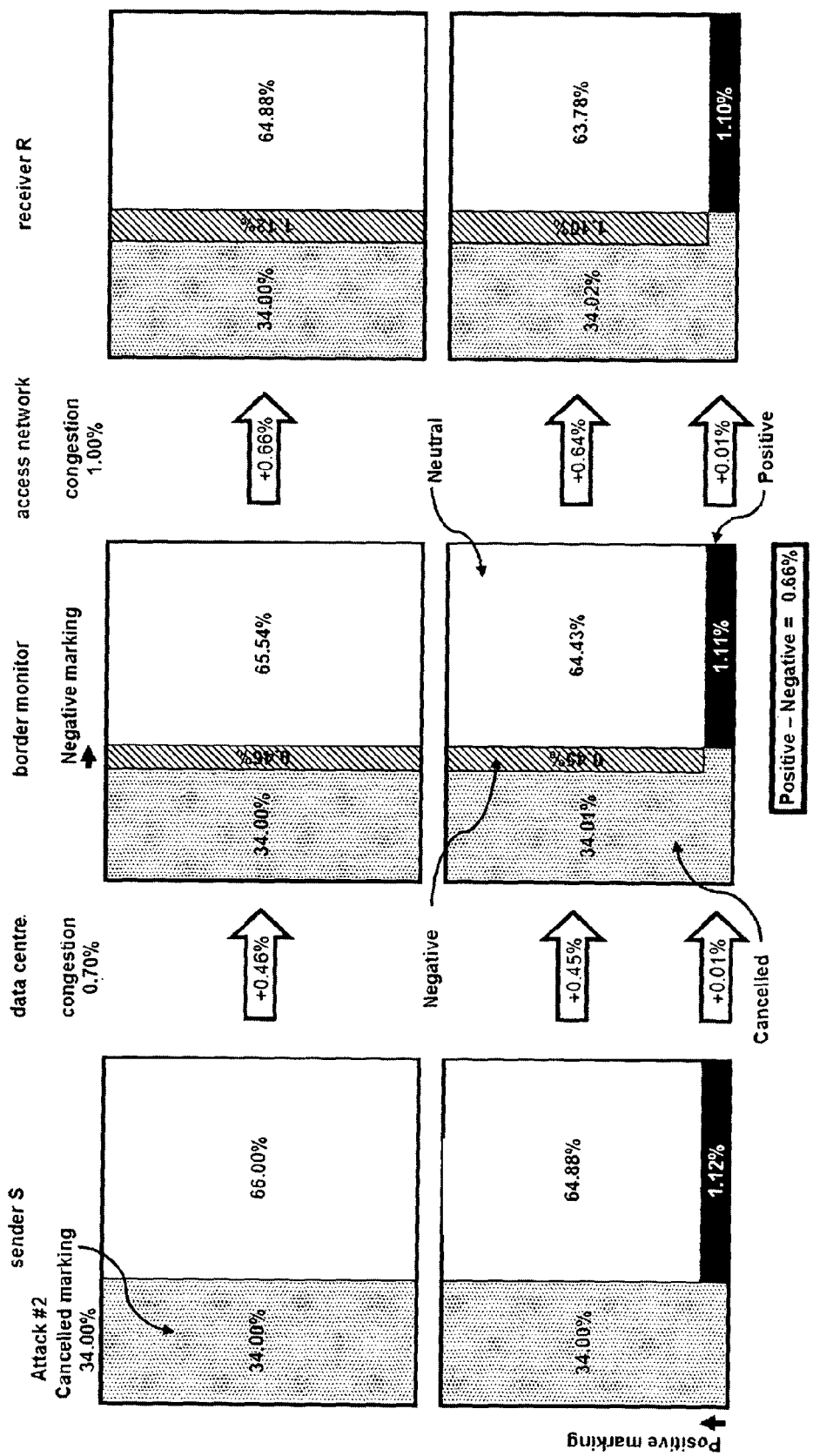
Figure 4 – Attack #2: Signal Poisoning with Both Markings

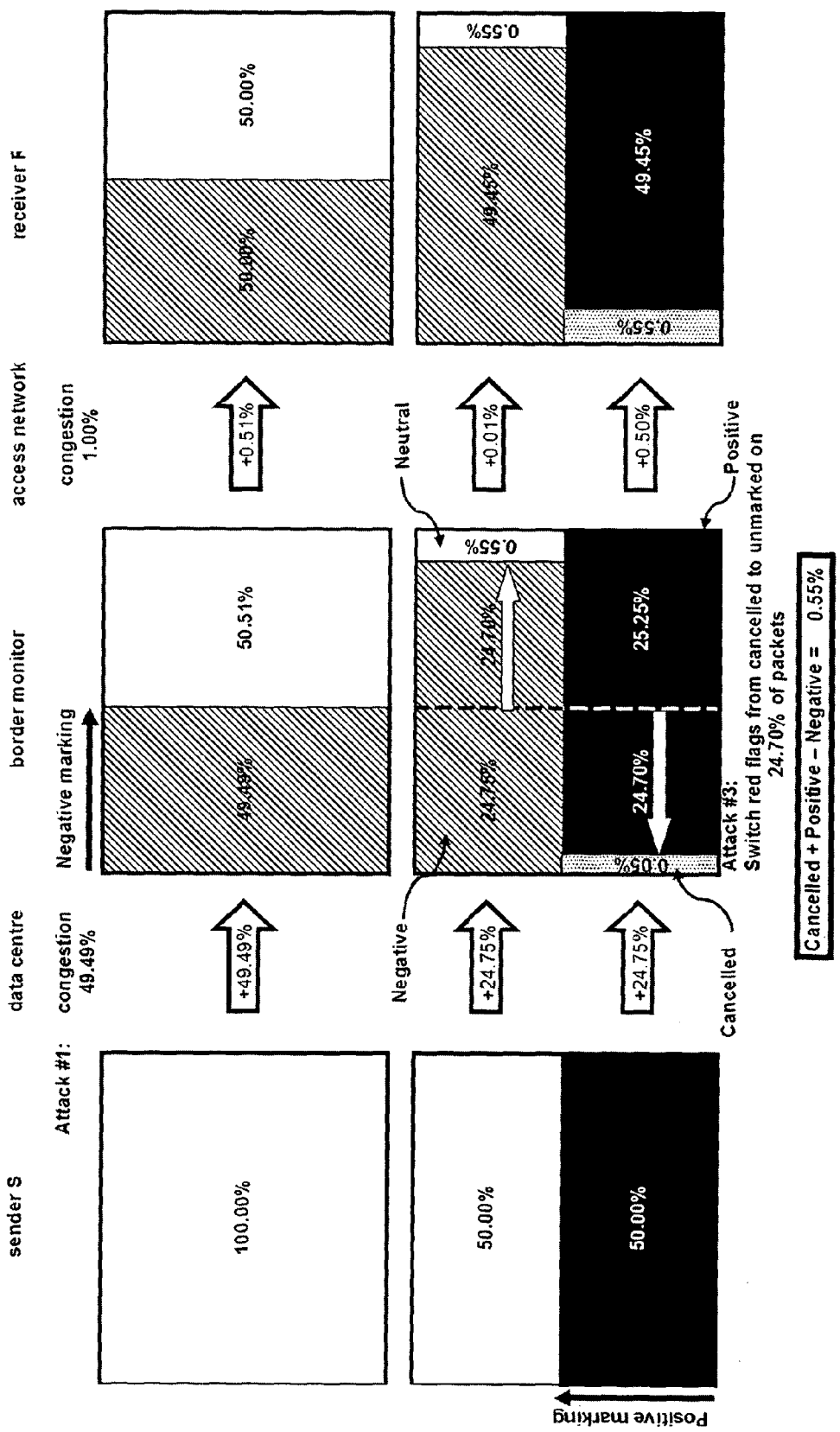
Figure 5 – Attack #3: Switching Negative Markings Combined with Extreme Upstream Congestion

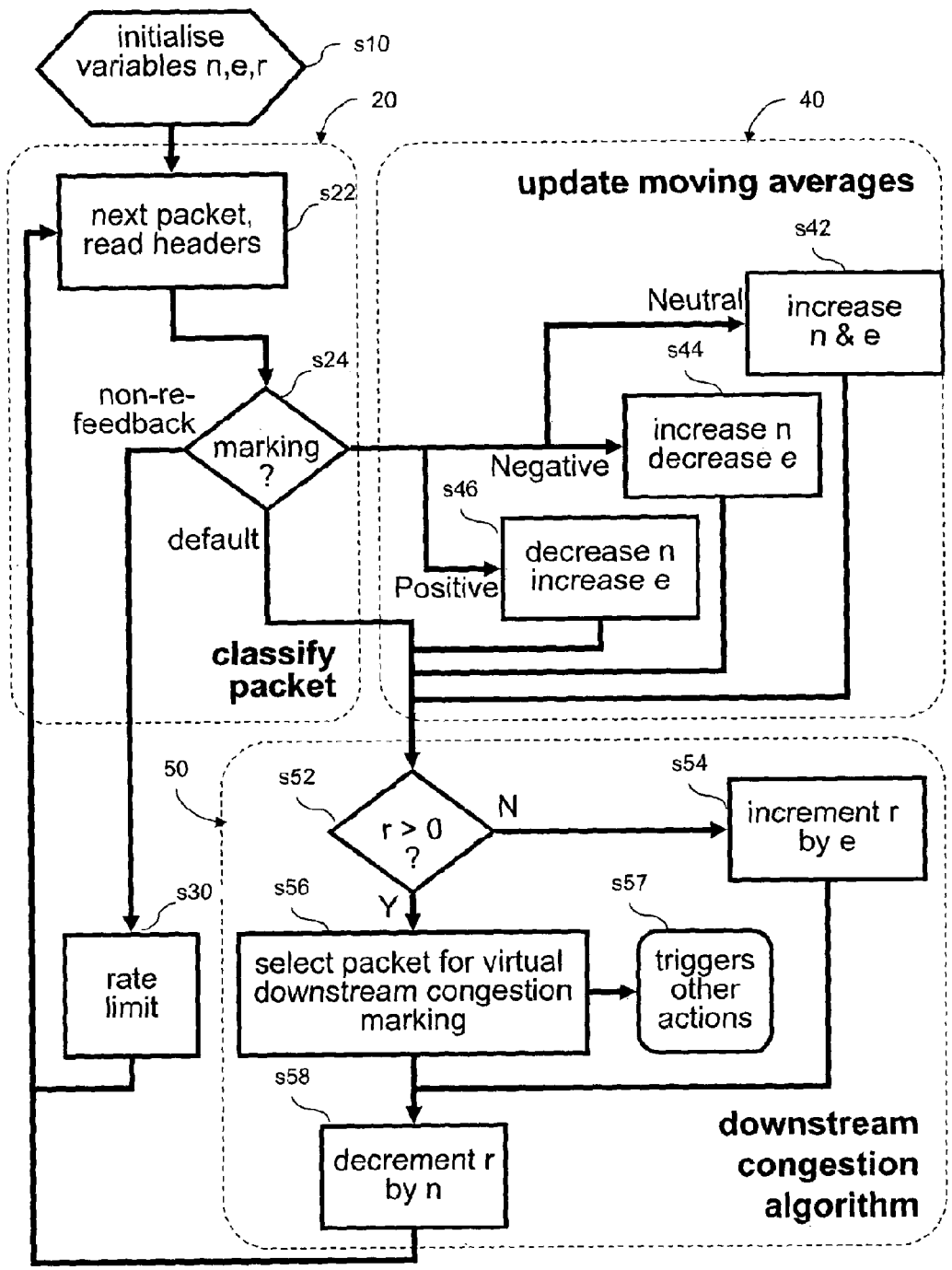
Figure 6 – Process for measuring downstream congestion from superimposed encodings

DETERMINING PATH CONGESTION MEASURES

This application is the U.S. national phase of International Application No. PCT/GB2012/000562 filed 29 Jun. 2012 which designated the U.S. and claims priority to EP Patent Application No. 11250620.9 filed 30 Jun. 2011 and GB Patent Application No. 1122006.8 filed 20 Dec. 2011, the entire contents of each of which are hereby incorporated by reference.

TECHNICAL FIELD

The present invention relates to determining path congestion measures. More specifically, aspects of the present invention relate to methods and apparatus for the determination of measures indicative of downstream path congestion in respect of a node via which a plurality of data units are traversing an end-to-end path from a sender to a receiver.

BACKGROUND TO THE INVENTION AND PRIOR ART

Consider a scenario where one network sends traffic into another network through a mutual attachment point. Mechanisms exist to measure the amount of congestion that this traffic is expected to cause downstream of the measuring point, by monitoring certain metrics that are all visible locally at the attachment point.

It is likely that a downstream network will want to use such a measurement of downstream congestion to in some way constrain the upstream network. For instance, the downstream network may wish to limit the amount of congestion that traffic from the upstream network can cause. It then becomes in the upstream network's interest to try to manipulate the metrics in the traffic in order to pervert the integrity of the measurements to its advantage. The present inventor has identified a need for a measurement technique that is robust to any manipulation by the upstream network to its advantage.

Some basic concepts will now be presented to facilitate understanding of the invention presented later on.

Packets

Data sources typically split the data they send into small units known as packets. A packet consists of a header and a payload. The great majority of packets carried by commercial networks nowadays are so-called Internet Protocol (IP) packets, which means they comply to the format specified in IETF RFC791 [see reference RFC791]. IP ensures the packets are correctly transmitted from the source to the destination. IP is a connectionless protocol—that means each packet carries sufficient information for any IP router to be able to forward it towards its destination without having had to previously set up any per-connection state in the router. Each packet could take a different route to reach the destination. In practice the routing mechanisms on the Internet mean that this seldom happens (unless there is some form of equipment failure).

Re-Feedback

One of the functions of a packet header such as the header of an IP packet is to accumulate information about the path it traverses on its way from the sender to the receiver. For instance, the time-to-live (TTL) field is decremented at every IP node or the explicit congestion notification (ECN [see reference: RFC3168]) field is probabilistically marked if the packet experiences congestion (see below). This path information allows nodes on the path to monitor characteristics of the path experienced so far (the upstream path). Typically mechanisms exist to allow the receiver to feed back this information to the sender.

International application WO2005/096566 describes a mechanism called re-feedback [see reference: [re-feedback]—details later], whereby the source re-inserts into the forward data path this information fed back to it by the receiver that had accumulated along the whole path. The sender may reinsert this information using a separate field in the packet header to that used to accumulate the original path metric or alternatively, it may initialise the value of the metric in the original field to a value that reflects the feedback it receives.

Any node along the path may then monitor the characteristics of the whole path at least a round trip ago. Given any node can already monitor the characteristics of the upstream path, it can subtract this froth the re-inserted whole path information to calculate an expectation of the characteristics of the downstream path (the rest of the path still to be traversed by packets it forwards).

Wherever measurements are taken in a network, the result of this subtraction should never be persistently negative, unless the source originally understated the whole path metric. International application WO2005/1109783 proposes using this fact for a mechanism to detect that a source is persistently understating a characteristic of the path in a flow of packets. The mechanism can sanction the flow accordingly to make it in the source's interests to correctly declare the whole path characteristic to the network. Thus the integrity of the re-inserted feedback information can be assured relative to the original feedback.

Distributed Bandwidth Sharing and Congestion

Data traversing the Internet follows a path between a series of routers, controlled by various routing protocols. Each router seeks to move the packet closer to its final destination. If too much traffic traverses the same router in the network, the router can become congested and packets start to experience excessive delays whilst using that network path. If sources persist in sending traffic through that router it could become seriously overloaded (congested) and even drop traffic (when its buffers overflow). If sources still persist in sending traffic through this bottleneck it could force more routers to become congested, and if the phenomenon keeps spreading, that can lead to a congestion collapse for the whole Internet—which occurred regularly in the mid-1980s.

The solution to that problem has been to ensure that sources take responsibility for the rate at which they send data over the Internet by implementing congestion control mechanisms. Sources monitor feedback from the receiver of the metric that characterises path congestion in order to detect when the path their data is following is getting congested, in which case they react by reducing their bit-rate. In the absence of any sign that the path is congested, they may slowly increase their rate.

The typical path characterisation metrics that sources monitor are the average roundtrip time (RTT) for the data path, the variance of the roundtrip time (jitter) and the level of congestion on the path. Congestion is one of the parameters controlling the rate adaptation of a source sending data over a congested path.

The congestion level can be signalled either implicitly (through congested routers dropping packets when their buffers overflow or to protect themselves) or explicitly (through mechanisms such as explicit congestion notification—see next subsection). Currently the most common option is implicit signalling. Historically, routers would drop packets when they got completely saturated (which happens when a traffic burst cannot be accommodated in the buffer of the router)—this policy is called Droptail. Random Early Detection (RED) [see reference: RED] is an improvement where routers monitor the average queue length in their buffer and when the average queue is higher than a given threshold, the router starts to drop packets with a probability which increases with the excess length of the queue over the threshold. It is widely used in today's Internet because it allows sources to react more promptly to incipient congestion and it keeps queues from growing unnecessarily long. Sources using TCP are able to detect losses, because a packet loss causes a gap in the sequence; whenever a TCP source detects a loss, it is meant to halve its data transmission rate, which alleviates the congestion on the router at the bottleneck.

Explicit Congestion Notification

Explicit Congestion Notification (ECN) [see reference: RFC3168] further improves on RED by using a two-bit ECN field in the IP header to signal congestion. It runs the same algorithm as RED, but instead of dropping a packet, it sets its ECN field to a Congestion Experienced (CE) codepoint. The ECN standard requires the sender to echo any congestion mark signalled in the data; for instance, a TCP receiver sets an Echo Congestion Experienced (ECE) flag in the TCP header, which the TCP source interprets as if the packet has been dropped for the purpose of its rate control. In turn the source then reacts to the congestion by halving its transmission rate and notifies the receiver of this using a Congestion Window Reduced codepoint.

The four values of the two-bit ECN field in the IP header are:
 "Non ECT", which signifies that the packet belongs to a flow that doesn't support ECN;
 "ECT(0)" and "ECT(1)", which signify that the packet belongs to a flow that supports ECN and that upstream routers haven't had to mark the packet; and
 "Congestion Experienced" (CE) which signals that a packet has experienced incipient congestion.

Re-ECN

Re-ECN [see reference: re-ECN] is an example of a system that utilises re-feedback to provide upstream and downstream congestion information throughout the network. It is similar to ECN but uses an extra unused bit in the packet header. This bit is combined with the two-bit ECN field to create four extra codepoints.

The simplest way to understand the protocol is to think of each packet as having a different flag (or codepoint) indicating how much the bytes in the packet are worth. At the start of a flow, a cautious flag is used to indicate that the sender does not have sufficient knowledge of the path and all the bytes in the packet are worth +1. Cautious flags are also used whenever the sender becomes unsure about the current state of the path.

By default packets are marked with Neutral flags which indicate that the bytes in the packet are worth zero. If packets encounter congestion during their progress through the network the ECN marking applied by the congested router are considered as Negative flags that make the bytes in the marked packets worth −1. The destination will feed back a count of the number of Negative flags it has seen. For every Negative flagged byte it is informed of, the sender should mark an equivalent number of bytes it sends in a subsequent packet or packets with a Positive flag, which makes all the bytes in that packet worth +1. The Positive flag re-echoes or reinserts the congestion feedback back into the forward-travelling stream of packets, hence the name re-ECN. These Positive flags will not be modified by the network once they are set by the sender.

If a packet has a Positive flag it will sometimes be termed a Positive packet. If it has a Negative flag, it will be termed a Negative packet, and so forth.

There is a small possibility that a Positive packet will in turn be marked Negative by a congested router, but the encodings are chosen so that the original Positive marking survives as well—the bytes in packets with both Positive and Negative markings are considered worth 0 and these packets are described as Cancelled.

At any intermediate node the upstream congestion is given by the proportion of Negative flagged bytes to total bytes. Thus the continually varying congestion level is effectively encoded in a stream of packets by interpreting the stream of Negative or non-Negative (Neutral) markings as a unary encoding of ones or zeroes respectively. Similarly, the congestion level of the whole path is encoded as a stream of Positive or non-Positive (Neutral) markings. The expected downstream congestion from any intermediate node can then be estimated from the difference between the proportion of Positive flags and the proportion of Negative flags, as described in International application WO2006/079845. The difference between the proportions of flags in these two sequences can be thought of as a third virtual sequence of flags on the packets, representing downstream congestion. However, these virtual flags only result from a mathematical operation (subtraction); they do not physically appear on packets.

Congestion Exposure (ConEx)

In June 2010, the Internet Engineering Task Force (IETF) chartered a new Congestion Exposure (ConEx) working group to add re-feedback of path congestion to the Internet Protocol (IP—initially IPv6) and to make the necessary modifications to the Transmission Control Protocol (TCP), both as experimental standards. The ConEx protocol will be based on the re-ECN protocol, but it will be slightly different because it is required to be usable independently of ECN, although it is recognised that its full benefit is only possible with ECN see reference: [conex-mech].

The final form of the ConEx protocol to be standardised by the IETF is not yet determined. Therefore in this specification the re-ECN protocol will be used as a concrete embodiment, given it has been fully specified and implemented.

Perverting the Integrity of Downstream Path Characteristics

It has been recognised in section 4.4 of [re-ecn-motive] that, if downstream path characterisation is calculated by taking the difference between two superimposed unary encodings such as is disclosed in WO2006/079845, it seems possible to pervert the integrity of this characterisation. An example scenario will now be described using FIG. 1, then it will be used to show the potential extent of this problem.

A data sender "S" 11 is attached to a network such as a data centre 10 both of which may be owned by the same data centre operator. The data centre, is in turn attached to an access network 20 via a network attachment node "Na" at an attachment point 13. (i.e., connection point including an active electronic device that is attached to a network and is capable of creating, receiving . or transmitting information over a communication channel). A data receiver "R" 19 attaches to the same access network at a network attachment node at attachment point 17. Network 1U includes routers 15. Network 20 includes routers 25.

For the purpose of this explanation, FIG. 1 shows a single end-to-end path 12 (see "Key to Schematic"), along which packets flow from sender "S" 11 to receiver "R" 19. From the point of view of the network attachment node "Na" at attachment point 13, this end-to-end path 12 comprises an upstream portion 12a (extending from sender "S" 11 via one or more of routers 15 of network 10 to attachment point 13) and a downstream portion 12b (extending from attachment point 13 via one or more of routers 25 of network 20 and attachment point 17 to receiver "R" 19). It will be understood that packets travelling from sender "S" 11 to receiver "R" 19 need not all traverse the same path, and that the division between "upstream" and "downstream" on any path will depend on the entity from whose point of view the path is to be regarded. The following explanation would be applicable in relation to other more complex scenarios, but in the interests of clarity, this simple scenario will be used.

As the data centre network 10 forwards packets across the border with the access network 20, the access network monitors the re-ECN protocol fields in packets passing the attachment point 13. The function at the attachment point consists of a border monitor that measures the level of downstream congestion and some other function that acts on what it measures. It might limit the amount of downstream congestion that the data centre network can cause in the access network, as is discussed in International application WO2006/082443, and in reference [Jacquet08]. Alternatively, it might trigger various management actions, or it may send the measurements to an accounting system in order to levy charges.

Normally, the access network would count arriving Positive packets to measure downstream congestion. It might expect to see a few Negative packets due to congestion within the data centre, but probably not many. It would subtract the bytes in these few Negative packets from the count of bytes in Positive packets to calculate how much congestion remained on the rest of the path, rather than in the data centre.

FIG. 2 represents a certain volume of transmitted data by the area of a square. The square is shown divided into areas horizontally to represent the proportions of packets marked by congested network elements (Negative) or not (Neutral). The square is also shown divided into areas vertically to represent the proportions of packets marked by the sender to expose whole-path congestion to the network (Positive) or not (Neutral).

FIG. 2 shows a typical scenario, where there is 1.00% congestion in the access network and only 0.70% congestion in the data centre network. Therefore, when traffic arrives at the border of the access network (top centre square), 0.70% of packets will already have been flagged Negative by the data centre network, leaving 99.30% unmarked (Neutral).

The congestion marking algorithm in network equipment is deliberately designed so that packets can be marked randomly without regard to what marking any particular packet already has. Therefore, by the time packets reach receiver R, a further 1.00% of the Neutral packets will have been marked Negative, that is 1.00% of 99.30%=0.99% more Negative packets added to the 0.70% already flagged Negative, which adds up to 1.69% Negative packets at the destination (all percentage figures are given accurate to two decimal places). These proportions of markings are illustrated graphically (but not to scale) in the top row of FIG. 2.

The receiver R will send feedback to the sender that 1.69% of packets have arrived with the Negative "congestion experienced" (CE) flag set. Then, in compliance with the re-ECN protocol, the sender S will set the Positive flag on the same proportion (i.e. 1.69%) of packets (bottom left of FIG. 2). As the mixture of Positive and non-Positive (Neutral) packets passes through the two networks, they will also be flagged Negative to indicate the congestion they experience. If, for the purposes of illustration, we assume that the congestion level remains stable, these packets will experience the same level of congestion in each network as before. Given that the Negative and Positive signals can be set independently, this will lead to the data centre network congestion marking 0.70% of the Neutral packets and 0.70% of the Positive packets. That will result in 0.70% of the 1.69% of packets that start out flagged Positive being flagged Negative as well. Thus about 0.01% of packets will be marked both Positive and Negative. As already explained, such packets are termed Cancelled because the Positive marking that indicates whole path congestion is "cancelled-out" by the Negative marking that indicates upstream congestion on the same packet.

Of the other 98.31% of packets that start out unmarked (Neutral), 0.7% will be marked Negative, that is 0.69% of all packets arriving at the access network will be Negative. Given that 1.69% of packets were originally Positive and the data centre marks 0.01% Negative, that will leave 1.68% marked Positive on arrival at the access network.

The attachment point at the ingress to the access network can then subtract the proportion of Positive packets (1.68%) from the proportion of Negative packets (0.69%) to estimate that downstream congestion is (1.68%-0.69%)=0.99%, which is a reasonable estimate of the actual congestion downstream of this attachment point, which (it will be recalled) is 1.00%.

Although the data centre scenario of FIG. 1 is used to illustrate vulnerabilities in the re-ECN protocol, of course, similar attacks could be mounted by any network (or other such entity) forwarding packets to any other network. The data centre network mounting the attacks could just as easily be a home network, a University network or one commercial network forwarding packets to another commercial peer.

Whatever the scenario, the markings on the packets will always be under the control of the upstream network until the packets are handed over at the attachment point between the networks. It will always be in an upstream network's interest in relation to issues of congestion accountability at least) to try to make the measured level of downstream congestion appear as if it is less than in reality. A robust technique is required that can reliably measure congestion downstream of the attachment point and that can be verified to the satisfaction of both parties, even though the upstream network could have altered the packet markings beforehand.

Attack Strategy #1: Extreme Upstream Congestion

Returning to the example data centre scenario of FIG. 1, if the data centre sets both Positive and Negative flags on nearly all packets, it seems to be able to pervert the access network's measurement of downstream congestion to its advantage. The following example illustrates the outcome of this strategy. Imagine there is still 1.00% congestion in the access network downstream of the data centre network. The data centre network can pretend that congestion is very high within the data centre, perhaps marking 90.91% of packets as Negative, as shown in FIG. 3. Then when the access network marks 1.00% of packets Negative it will result in 91.00% Negative packets, because the data centre only leaves 9.09% of packets not Negative, which when marked by the access network with 1.00% probability will only add 0.09% Negative packets, resulting in 91.00% Negative packets.

The data centre can comply with the re-ECN protocol by flagging 91.00% of packets as Positive at the source, but also continuing to mark 90.91% of packets Negative, which is unusual but not contrary to any protocol. Only the 9.00% of packets originally left unmarked (Neutral) can become Negative. Therefore, only 8.18% will be flagged Negative at the border with the access network. The much larger proportion (91.00%) of packets flagged Positive will result in a much larger proportion (82.73%) of packets Cancelled (i.e. flagged both Positive and Negative) arriving at the border with the access network, leaving only 8.27% still Positive.

Once these Positive packets pass through the 1% congestion-marking in the access network, 8.19% will be left Positive, which will correctly match the 8.19% proportion of packets that are Negative. Therefore the access network cannot complain that the traffic is non-compliant with the re-ECN protocol, because nowhere will there be insufficient Positive bytes relative to Negative.

However, when the access network subtracts Negative from Positive bytes as packets arrive from the data centre, it will measure downstream congestion as 8.27%-8.18%=0.09%. Whereas the actual value should be 1.00%. Thus, by introducing a very high amount of (apparent) congestion in its own network and otherwise complying with the letter of the re-ECN protocol, the data centre has managed to make the access network think that data centre traffic is causing only 0.09% congestion in the access network, which is eleven time less than the 1.00% congestion it is actually causing.

Attack Strategy #2: Signal Poisoning with Both Markings

In a second strategy to pervert the access network's measurement of downstream congestion, the operator of the data centre network (10 in FIG. 1) could use the re-ECN protocol as normal, but in addition arrange for the sender S to mark a high proportion of all packets as Cancelled (i.e. flagged both Positive and Negative). An example of this attack is shown in FIG. 4, where the sender S starts by flagging 34.00% of packets as Cancelled.

The Positive flags on these packets do not contribute to any measurement of downstream congestion, because they are all Cancelled out by the Negative flags on the same packets. Also, these packets are immune to further congestion marking because thy are already marked Negative. It can be seen from FIG. 4 that the data centre operator can still apply the re-ECN protocol to the remaining 66.00% of packets. If the access network operator subtracts Negative from Positive markings in the packets it receives from the data centre network it will measure downstream congestion as 66.00% of its actual value, that is 0.66% rather than 1.00%. Thus the upstream network can reduce the level of congestion that the access network measures by effectively "poisoning" the re-ECN signal with Cancelled packets.

Attack Strategy #3: Switching Negative Markings

It has been proposed in [re-ECN.motivation] that a border monitor could negate attack strategy #2 when calculating downstream congestion by using the following formula to calculate downstream congestion:

$$\text{Downstream congestion} = \text{Cancelled bytes} + \text{Positive bytes} - \text{Negative bytes} \quad (1)$$

In other words, this approach counts bytes in Cancelled packets in addition to those solely marked Positive before subtracting bytes in packets marked Negative. Both strategies #1 and #2 introduce a large proportion of Cancelled packets, so counting these as Positive would appear to negate these attacks.

However, if the operator of the upstream network (e.g. the data centre network in FIG. 1) suspects that the border monitor is using this approach, it can adopt a counter-strategy, termed attack strategy #3, that still reduces the apparent level of downstream congestion given by equation (1). The upstream network can guarantee to make downstream congestion appear lower if it switches Negative markings from Cancelled packets to unmarked (Neutral) packets. This approach ensures that traffic still complies with the re-feedback condition that there must not be more Negative than Positive traffic, because it increases the proportion of Positive packets and the proportion of Negative packets by the same amount.

If a downstream network includes Cancelled packets in its calculation of downstream congestion, it is advantageous to an upstream network to reduce the proportion of Cancelled packets, whereas attack #2 showed that when the downstream network does not include Cancelled packets in its calculations it is advantageous for the upstream network to increase the proportion of Cancelled packets.

In typical circumstances where low levels of congestion prevail the proportion of Cancelled packets will be very small. For instance, it would be unusual for congestion to be higher than in the scenario of FIG. 2 where total congestion is 1.69%, and in that case only 0.01% of packets end up as Cancelled. Therefore, given attack strategy #3 consumes Cancelled packets, this attack only seems able to achieve a very small reduction in downstream congestion. Attack strategy #3 can however be combined with strategy #1, to greatly reduce apparent downstream congestion—by up to half of its actual value. Strategy #1 greatly increases the proportion of Cancelled packets, giving plenty to switch from Cancelled to Neutral using strategy #3.

FIG. 5 illustrates a numerical example of this combined attack. First (top centre), the data centre applies strategy #1, faking a high 49.49% level of congestion, which results in 50.00% Negative markings (top right) once it has also passed through congestion in the access network, which is still 1.00% as in previous examples.

The sender S initially complies with the re-ECN protocol by marking 50.00% of packets Positive (bottom left). Once all the sender's packets have been subjected to the same 49.49% fake congestion, the proportions marked Cancelled and Negative will both be about 24.75% (percentages accurate to 2 decimal places). Then the data centre network applies strategy #3; it switches the Negative markings from most of the Cancelled packets onto art equal amount of unmarked (Neutral) traffic. In FIG. 5 (bottom centre) it has chosen to switch 24.70% of packets, so the proportion of Positive packets and Negative packets increases by 24.70%.

When the access network uses equation (1), the data centre network has successfully fooled it into calculating that downstream congestion is 0.55% rather than 1.00%, a reduction by nearly one half. These combined attacks still comply with the constraint of the re-feedback protocol that there must be no more Negative packets than Positive, because it can be seen in FIG. 5 (bottom right) that Negative and Positive packets end up equal as required.

REFERENCES

[re-feedback]: Briscoe, B., Jacquet, A., Cairano-Gilfedder, C. D., Salvatori, A., Soppera, A. & Koyabe, M.: "Policing Congestion Response in an Internetwork Using Re-Feedback", Proc. ACM SIGCOMM'05, Computer Communication Review 35(4): 277-288 ACM Press (August 2005).

[RFC3168]: Ramakrishnan, K. K.; Floyd, S. & Black, D.: "The Addition of Explicit Congestion Notification (ECN) to IP", Internet Engineering Task Force Request for comments 3168 (September 2001).

[RED]: S. Floyd & V. Jacobson: "Random Early Detection gateways for Congestion Avoidance", IEEE/ACM Transactions on Networking, Vol 1-4 (397-413) August 1993.

[re-ECN]: B. Briscoe, A. Jacquet, T. Moncaster, A. Smith: "Re-ECN: Adding Accountability for Causing Congestion to TCP/IP", IETF Internet Draft draft-briscoe-tsvwg-re-ecn-tcp-09 (October 2010).

[re-ECN-motive]: B. Briscoe, A. Jacquet, T. Moncaster, A. Smith: "Re-ECN: A Framework for Adding Congestion Accountability to TCP/IP", IETF Internet Draft draft-briscoe-tsvwg-re-ecn-tcp-motivation-02 (October 2010).
[RFC791] Postel (Ed.), J.: "Internet Protocol", Internet Engineering Task Force STD 5, RFC 791 (September 1981).
[conex-mech]: M. Mathis & B. Briscoe: "Congestion Exposure (ConEx) Concepts and Abstract Mechanism", IETF Internet Draft draft-ietf-conex-abstract-mech-01 (March 2011).
[Jacquet08]: Jacquet, A., Briscoe, B. & Moncaster, T.: "Policing Freedom to Use the Internet Resource Pool", In: Proc Workshop on Re-Architecting the Internet (ReArch'08) ACM (December 2008).

DISCUSSION OF PRIOR DISCLOSURE(S)

International application WO2006/079845 (referred to above) describes how two separate signals can be encoded into a sequence of packets, each using a unary encoding to represent respectively whole-path congestion and upstream congestion. Then expected downstream congestion can be measured by counting the size of those packets marked with the first signal and subtracting the size of those marked with the second signal. It does not mention the vulnerability of this approach to the attacks described earlier.

Appendix C.1 of [re-ECN.motivation] entitled "C.1. Bulk Downstream Congestion Metering Algorithm" gives the pseudocode of the trivially simple subtraction algorithm of Equation (1) that implements measurement of the volume of downstream congestion.

Appendix A of [re-ECN] entitled "Precise Re-ECN Protocol Operation" derives the precise congestion marking that will result from multiple congested queues on a network path, which a sender complying with the re-feedback protocol will then re-insert into the network. It then derives a formula for the precise congestion downstream of a measurement point between two networks in terms of the signals measurable locally at that point. In a final step, it shows that the difference between whole path and upstream congestion signals is a reasonable approximation of congestion downstream of this point. No mechanism is proposed to implement the precise formula and no reason is given for why such a mechanism would be needed. It is merely used as a step in the analysis to reach the approximation, which is recommended for use because it is easy to implement.

The present inventor has identified that vulnerabilities of re-ECN encoding seem to stem at least partly from the need for the encodings of the two signals to be independent. This means that it has to be possible to mark or not mark a packet to encode whole-path congestion and it has to be separately possible to mark or not mark a packet to encode congestion on the path so far. Therefore it has to be possible for one packet to be marked both Positive and Negative, which seems to make the protocol vulnerable to the above attacks.

A previous variant of the re-feedback protocol that lacked independence between the two signals was proposed in section 4.1 of [re-feedback]. However, this lack of independence between the signals became the cause of increasing complexity. It was also found to introduce a different security flaw, where networks could undetectably alter the signal sent by the source (see Appendix B of [re-ECN]).

Therefore the re-ECN protocol was updated to make room for two independent signals. During normal operation of the updated protocol, intermediate network nodes are expected to solely exercise control of the congestion experienced (Negative) flag while the source is expected to solely exercise control of the re-echoed congestion (Positive) flag. However, there seems to be nothing to stop the sender (or an upstream network) adding or removing Cancelled packets.

Section 4.4 of [re-ECN.motivation] entitled "Ingress Policing" describes the attack that poisons the re-ECN signal with Cancelled packets (Attack Strategy #2 above). In the same document [re-ECN.motivation], Appendix B.1 entitled "Per-user Policing" proposes a way to negate this attack. It suggests that, when a policer calculates downstream congestion, it should add a count of bytes in Cancelled packets to the count of bytes in Positive packets. However, subsequent (unpublished) analysis by the present inventor has shown that this approach is not robust—it merely opens up a vulnerability to a different attack (strategy #3 described above).

The final paragraph of Appendix B of [re-ECN] entitled "Justification for Two Codepoints Signifying Zero Worth Packets" says:

"Finally, a little redundancy can be very powerful in a scheme such as this. In one flow, the proportion of packets changed to CE should be the same as the proportion of RECT packets changed to CE(−1) and the proportion of Re-Echo packets changed to CE(0). Double checking using such redundant relationships can improve the security of a scheme (cf. double-entry book-keeping or the ECN Nonce). Alternatively, it might be necessary to exploit the redundancy in the future to encode an extra information channel."

A form of this redundancy is used in the less preferred solution discussed below.

BRIEF SUMMARY OF EXAMPLES

According to a first aspect of the present invention, there is provided a method of determining a measure indicative of downstream path congestion in respect of a node via which a plurality of data units are traversing an end-to-end path from a sender to a receiver, each said data unit having:

a first indication settable in dependence on information from the receiver to each of at least two states whereby to indicate different levels of congestion experienced on the end-to-end path by data units previously received by the receiver; and a second indication settable to an initial state, and to at least one updated state indicative of congestion experienced by data units on their path from the sender to said node;

the method comprising:

receiving a plurality of said data units at said node; and determining said downstream path congestion measure in dependence on an inflation factor itself dependent on the proportion of a set of said data units whose second indication on receipt at said node is in said initial state.

In particular, the inflation factor may be dependent on the proportion of the data units in the set whose second indication on receipt at the node is in a state such that is still capable, according to the protocol being used, of being updated to an updated state indicative of congestion experienced in the event that the data unit subsequently experiences congestion."

According to preferred embodiments, the downstream path congestion measure may be determined in dependence on the product of the inflation factor and a measure of the total bit-rate of the plurality of data units received at the node.

According to preferred embodiments, the inflation factor may be proportional to the reciprocal of the proportion of the set of said data units whose second indication on receipt at the node is in the initial state.

According to preferred embodiments, the determination may be performed according to an algorithm such that the downstream path congestion measure so-determined is substantially independent of the number of and/or proportion of data units having both their first indication set to indicate that the level of congestion experienced on the end-to-end path by data units previously received by the receiver was at or above a predetermined end-to-end congestion threshold and their second indication set to indicate that the level of congestion experienced by data units on their path from the sender to the node was at or above a predetermined upstream congestion threshold. With reference to the discussion above of possible "Attack Strategies", this essentially ensures that the measure determined is not influenced by the number of packets received that are "Cancelled" packets.

According to preferred embodiments, received data units may be categorised according to a plurality of predetermined categories in dependence on the state to which one or both of their first and second indications are set, the downstream path congestion measure being determined in dependence on at least two respective counts, a first of which is indicative of a measure, of the volume of said data units categorised as being of a first predetermined category and a second of which is indicative of a measure of the volume of said data units categorised as being of a second predetermined category different from the first predetermined category. The predetermined categories may be defined with reference to how both indications in a particular data unit have been set, or with reference to how just one of the indications have been set, irrespective of the state to which the other indication has, been set.

According to preferred embodiments, the measure of downstream path congestion may be determined in dependence on:
  a first measure (which will be referred to later as "n", or "No Positive flag") representing the bit-rate of data units whose first indications indicate that the level of congestion experienced on the end-to-end path by data units previously received by the receiver was below a predetermined threshold; and
  a second measure (which will be referred to later as "e", or "No Negative flag") representing the bit-rate of data units whose second indications indicate that the level of congestion experienced by data units on their path from the sender to the node was below a predetermined threshold.

According to a preferred embodiment, the downstream congestion rate "v" is determined substantially according to or in dependence on the formula:

$$v = x(1 - n/e)$$

where:
  "x" represents the bit-rate of all data units received by the node which conform to a protocol whereby said data units have a first indication settable in dependence on information from the receiver to each of at least two states whereby to indicate different levels of congestion experienced on the end-to-end path by data units previously received by the receiver, and a second indication settable to an initial state and to at least one updated state indicative of congestion experienced by data units on their path from the sender to the node;
  "n" represents the bit-rate of said data units whose first indications indicate that the level of congestion experienced on the end-to-end path by data units previously received by the receiver was below a predetermined threshold; and
  "e" represents the bit-rate of said data units whose second indications indicate that the level of congestion experienced by data units on their path from the sender to the node was below a predetermined threshold.

According to preferred embodiments, the inflation factor may be determined in dependence on one or both of two predetermined counts chosen such that changes in the manner in which first and second indications have been set will lead to a determination of a higher downstream path congestion measure if the determination is made using an inflation factor dependent on one of said counts, and to a determination of a lower downstream path congestion measure if the determination is made using an inflation factor dependent on the other of said counts. The measure of downstream path congestion may be determined using whichever of the predetermined counts provides a measure indicative of a higher amount of downstream path congestion. Alternatively, the measure of downstream path congestion may be determined in some instances using an inflation factor determined in dependence on one of the predetermined counts and in other instances using an inflation factor determined in dependence on the other of the predetermined counts.

According to preferred embodiments, the inflation factor may be determined in dependence on one or both of:
  (i) a count indicating the proportion of a set of said data units received at the node whose first indication indicates that the level of congestion experienced on the end-to-end path by data units previously received by the receiver was above a predetermined end-to-end threshold and whose second indication is in the initial state; and
  (ii) a count indicating the proportion of a set of said data units received at the node whose first indication indicates that the level of congestion experienced on the end-to-end path by data units previously received by the receiver was below a predetermined end-to-end threshold and whose second indication is in the initial state.

According to preferred embodiments, the first and second indications in respect of a particular data unit are settable independently of one another.

According to a second aspect of the present invention, there is provided apparatus for performing a method according to the first aspect.

Various options and preferred embodiments referred to in relation to the first aspect are also applicable in relation to the second aspect.

Algorithms involved in the implementation of preferred embodiments can be regarded as having the following three functional components A, B and C that are not present (in combination) in prior art techniques. Of these, component C in particular affords protection against the whole class of attack strategies presented above:
Algorithm Component A: A value for downstream congestion is calculated as a fraction. The value of this fraction depends on the proportions of traffic volume with certain markings. This fraction relates to the measure used in previously disclosed implementations that take the proportion of re-feedback packets that are Positive and subtract the proportion of re-feedback packets that are Negative.
Algorithm Component B: The algorithm selects the above fraction from all packets with a re-feedback marking, irrespective of their specific marking.
Algorithm Component C: The fraction of re-feedback packets to be selected is inflated relative to the fraction that would be found by taking the proportion of re-feedback packets that are Positive and subtracting the proportion of re-feedback packets that are Negative. The inflation factor used is the volume of all re-feedback packets relative to the volume of only those re-feedback packets that are still not congestion-marked, that is in their initial unmarked state. This inflation factor may be 1 or greater than 1, but it cannot be less than 1. Thus, if proportion m of re-feedback packets is already congestion-marked, the calculated fractional value will be inflated by 1/(1−m) relative to the fraction of all re-feedback packets.

A count of the sizes of the selected packets or selected fractions of packets then represents the volume of downstream congestion. Or the bit-rate of selected packets represents the instantaneous downstream congestion rate.

Using the intermediate fractional value to select from all re-feedback packets (Algorithm Component B) makes this approach robust to attacks where those packets not measured to calculate the fraction are not in the expected proportions relative to those packets that are measured.

Algorithm Component C ensures that a measurement of downstream congestion cannot be perverted even if a large proportion of packets is congestion-marked as Negative upstream. Excess Negative congestion-marking is the element common to the whole class of attack strategies presented above, whether on its own, or in combination with Positive markings on the same packets to cancel the Negative markings.

Mathematically, prior disclosures implemented the following formula for downstream congestion rate:

$$v \approx z - u, \quad (2)$$

whereas preferred embodiments of the invention implement the following formula for downstream congestion rate:

$$v = x(z-u)/(z+y) \quad (3)$$

where:
x is the bit-rate of all re-feedback-enabled traffic (Neutral, Positive, Negative & Cancelled)
y is the bit-rate of unmarked packets (Neutral)
u is the bit-rate of packets marked with congestion but not re-echoed congestion (Negative)
z is the bit-rate of packets marked with re-echoed congestion but not congestion (Positive)

Alternatively, the new formula can be expressed in a form which has been found to be amenable to very simple implementation:

$$v = x(1 - (u+y)/(z+y)) \quad (4)$$
$$= x(1 - n/e),$$

where
n is the bit-rate of packets that are not marked with re-echoed congestion (no Positive flag)
e is the bit-rate of packets that are not marked with congestion (no Negative flag)

It will be noted that the above differs from prior art techniques in at least the following respects:
  Multiplication by x, which would not be necessary if the other variables were correctly in proportion to the rest of the traffic.
  Division by e, which makes the formula precise rather than approximate, making it robust to high levels of congestion that otherwise invalidate the approximation used in the prior art.

It will be understood that this is not equivalent to techniques involving a measurement function that randomly chooses a sample or sub-set of all traffic, then scales the measurement up pro-rata in order to obtain an estimated measurement in respect of all traffic. The measurement function does not choose the sub-set. Instead the sub-set is dictated by pre-existing markings on packets. Similarly, the inflation factor is dictated by the proportion of certain pre-existing markings on re-feedback packets, not on a sampling factor chosen by the measurement function.

This solution is applicable more generally than in the specific scenario described:
  It applies equally whether an indication with two states is "cleared" normally but can be "set" to indicate congestion, or vice versa.
  It applies whether the re-feedback protocol is used in Internet Protocol packets or the packets or frames of a different network protocol.
  It applies if a more comprehensive encoding is used (e.g. as in [conex.mech]) where any of the four main types of marking listed above may be encoded by more than one value.
  It applies if the above formula is transformed into other equivalent forms that are functions of a different subset of the possible packet markings.
  It applies whatever action is taken as a result of the determination of downstream congestion. For instance, the measure determined may be used for policing traffic to a contract, to trigger management action such as an alarm indicating that downstream congestion levels have exceeded a threshold, or to be accounted for as part of a contractual arrangement between a network operator and a client.
  It applies whether the traffic passing from one network to another traverses a single path, or multiple paths potentially at multiple locations (this is discussed in International application WO2011/045553)
  It applies whether the measurements are taken local to the attachment point or remote from it, perhaps using header encapsulation to convey the metrics from the point of attachment to the point of measurement (this is discussed further in co-pending European application EP10251106, unpublished at the priority date of the present application)
  It applies whether or not the integrity of the re-feedback protocol is currently being audited by a truth poker such as that disclosed in WO20051109783. Note, however, that robust security of the re-feedback protocol generally requires both the present normalisation technique and an audit function. The distinction here is that normalisation and audit run independently, but the integrity of the protocol depends on both of them operating.
  It applies whether the re-feedback signals are generated by the source or by a proxy (see International application WO2010/106311 and co-pending European application EP10250693.8, unpublished at the priority date of the present application for more information on use of proxies in relation to re-feedback).

It will also be understood that, typically, indications are set on individual data units to indicate how strongly a "stream" of data units is or has been experiencing congestion. If a data unit does not carry an indication, it does not necessarily mean that the individual data unit has not experienced congestion. While the encoding may be binary in respect of each data unit, the signal may be a number between 0 and 1 encoded over a stream of packets, dependent on the proportion that are set to 1, for example.

The solution is generally applicable to re-feedback if using a superimposed encoding such as that disclosed in WO2006/

079845 (an aim of which was to facilitate incremental deployment within existing Internet and networking practices).

BRIEF DESCRIPTION OF THE DRAWINGS

A preferred embodiment of the present invention will now be described with reference to the appended drawings, in which:

FIG. 1 shows a schematic diagram of a typical network;

FIG. 2 shows how downstream congestion may be measured with the Re-ECN protocol;

FIG. 3 illustrates how a network (or other entity) upstream of a network measuring downstream congestion using the Re-ECN protocol may attempt to pervert such measurements. This is referred to as "Attack #1: Extreme Upstream Congestion" above;

FIG. 4 illustrates "Attack #2: Signal Poisoning with Both Markings", also discussed above;

FIG. 5 illustrates "Attack #3: Switching Negative Markings Combined with Extreme Upstream Congestion", also discussed above; and FIG. 6 shows a process for measuring downstream congestion from superimposed encodings according to a preferred embodiment of the invention.

DESCRIPTION OF PREFERRED
EMBODIMENTS OF THE INVENTION

With reference in particular to FIG. 6, a method according to a preferred embodiment will now be described. In this method, packets are selected from a stream of packets passing a monitoring point (i.e, a physical communication network node including at least one digital signal processor providing an intelligent network service) using an algorithm (e.g. a computer program pre-stored in memory of a digital signal, processor) that depends on the markings on the packets. The packets that are selected can be considered to have been flagged with a virtual marking, then the bytes in the virtually marked packets encode how much congestion downstream of the point of measurement the stream of packets contributes to.

Once downstream congestion is (virtually) encoded into the stream of packets by these virtual marks, the encoding may be used for a range of purposes, for instance:

(i) The size in bytes of each virtually marked packet may be drained from a token bucket that is filled with tokens at a rate that represents the contracted rate at which congestion may be caused downstream by the network sending the stream of packets. Then, whenever the bucket empties, it may prevent traffic from proceeding on the basis that the contracted congestion rate and burst size has been exceeded (see WO2006/082443. [Jacquet08] for details).

(ii) The size in bytes of the virtually marked packets may be added to an account of the amount of downstream congestion contributed to by the party sending (or receiving) the packets.

(iii) The bit-rate of packets with virtual markings may be monitored, and if it exceeds a threshold it may trigger management actions to alleviate the congestion or to take further action to establish the cause of the anomaly.

Measurements of downstream congestion-volume may be used for many other purposes not explicitly listed here, just as measurements of data volume or data bit-rate may be used for a wide range of purposes.

In a preferred embodiment of the invention, the computerized algorithmic process for selecting packets from a stream passing the monitoring point so that the size of the selected packets encodes downstream congestion consists of the three main steps, shown as large dashed boxes in FIG. 6:

(i) Classify packet: by its markings (box 20)

(ii) Update moving averages: depending on packet classification (box 40)

(iii) Downstream congestion algorithm: that decides whether to select a packet dependent on the moving averages but not on the classification of the packet (box 50).

This digital signal processor algorithm is particularly preferred because, after the packet has been classified, it only requires two or three single cycle operations of a typical general purpose processor to update the moving averages and a further two cycles per packet to run the downstream congestion algorithm. Therefore this preferred algorithm requires only five or six cycles per packet to reach the point where it can select packets to be considered as virtually marked.

The automated processor process illustrated in FIG. 6 is also described using pseudocode as follows:

Pseudocode 1: Monitoring Downstream Congestion from Superimposed Encodings

```
1   /* Downstream congestion meter */
2   /* Assuming re-ECN encoding in draft-briscoe-re-ecn-tcp-09 */
3   meterDownCong( ) {
4      /* Initialise variables */
5      V = 0 /* downstream congestion-volume*/
6      n = 0 /* recent never-positive markings (NEUT or NEGV)*/
7      e = 0 /* recent ECT markings (NEUT or POSV or CAUT)*/
8      r = 0 /* remainder */
9      a = EWMA_WEIGHT
10     foreach packet {
11        s = readLength(packet)
12        eecn = readEECN(packet)
13        if (eecn != (ECT(0)
14              || Not-ECT)) {
15           /* A re-ECN enabled packet */
16           /* Update moving averages dependent on pkt marking */
17           switch(eecn) {
18           case (NEUT || CU):
19              n += (s−n)*a
20              e += (s−e)*a
21           case (POSV || CAUT):
22              e += (s−e)*a
23              n −= n*a
24           case (NEGV):
25              n += (s−n)*a
26              e −= e*a
27           }
28           if (r > 0) {   /* Select (1−n/e) re-ECN enabled packets */
29              V += s     /* Virtual downstream congestion mark */
30           } else {
31              r += e
32           }
33           r −= n
34        } else {
35           /* Not a re-ECN packet */
36           /* Action depends on policy, e.g. rate limit */
37        }
38     }
39  }
```

The above pseudocode maps to the flow diagram in FIG. 6 as follows:

Initialise all the variables (step s10): lines 5 to 9

Read the next packet and classify it, reading relevant header fields (step s22), in particular the extended ECN field (EECN) to determine the re-ECN marking (step s24): lines 10-12

Depending on the packet classification, the code updates moving averages of the relative rates of traffic with the different re-ECN markings (steps s42, s44, s46): lines 13-27

The core downstream congestion algorithm (steps s52, s54, s56, s57, s58): lines 28-33

Lines 34-36 are a placeholder for the action to be taken on traffic that chooses not to use the re-feedback protocol. For instance, such traffic may be rate-limited (step s30).

The core algorithm in lines 28-33 uses an internal variable r to select a proportion of packets that pass the test "if (r>0)" (step s52). Those packets that pass the test (step s56) can be considered as if they are given a virtual mark denoting downstream congestion. This example algorithm is being used to calculate congestion-volume, therefore in line 29 the size of those packets given a virtual mark is added to the count of congestion volume. If the algorithm were being used to trigger some other action (step s57) dependent on the level of downstream congestion, that action would be invoked instead or in addition at this point in the code.

The core algorithm works as follows. For the purpose of explanation only, consider a case with stable values of n and e. Imagine sufficient rounds of the "foreach packet" loop for the variable r to return to a value it held earlier, during which the algorithm respectively passes and fails the "(r>0)" test c times and b times. Each of the c times that the test passes, r is decremented by n and each of the b times that it fails r is both decremented by n and incremented by e. Therefore:

$-cn+b(e-n)=0$ or $b=cn/(e-n)$.

Downstream congestion b is the volume of packets that the algorithm selects as a proportion of the volume of all the packets it puts through the "(r>0)" test. A packet is selected every time the test passes, therefore downstream congestion is the bit-rate of all re-feedback packets inflated by the number of tests that pass as a proportion of all tests, whether pass or fail:

$v=xc/(c+b)$.

Note that, because the algorithm selects from re-ECN capable packets randomly, packets can be selected without paying attention to their size. Substituting for b from above, $$v = xc/(c + cn/(e-n))$$
$$= x/(1 + n/(e-n))$$
$$= x(e-n)/e$$
$$= x(1 - n/e),$$

which is indeed the fraction of all re-ECN packets that was required to be selected in equation (4) earlier.

Algorithm Component A described earlier is instantiated at lines 31 and 33; where the internal variable r incremented by e and decremented by n, which is equivalent to incrementing by the volume of Positive packets and decrementing by the volume of Negative packets.

Algorithm Component B described earlier is primarily instantiated at line 28, where packets with any re-feedback marking are presented as candidates for selection by the downstream congestion algorithm: not just packets with specific re-feedback markings. This functionality results from the structure of this algorithm component as a whole so is not confined to this single line of code, but line 28 is the salient point in the structure. It can better be seen in FIG. 6 where the flow of control converges into the "r>0" test (step s52) for all re-feedback packets of whatever marking.

Algorithm Component C described earlier is primarily instantiated at line 31, where whenever a packet is not selected, the remainder variable r is incremented by e, the proportion of bytes still not congestion-marked. This repeated addition to r whenever r is not great enough to select a packet effectively inflates the probability of selecting packets by the ratio between the volume of re-feedback packets and the volume of those packets still not congestion-marked. Again, the functionality results from the structure of this algorithm component as a whole, in particular the placement of this line within the relevant "else" clause, and is not confined to this single line of code. Also line 31 is where the variable e is finally used, but earlier lines of code initialise and maintain its value so that it can be used.

Note that in a production implementation it may also be necessary to test that downstream congestion is not negative (n≤e), but such tests are not included in the pseudocode in order to focus on the primary purpose of the implementation, rather than the exceptions.

The pseudocode that maintains the moving averages of the volumes of different markings is only one of many techniques that may be used to implement embodiments of the invention. The following explains the particular technique chosen for this embodiment.

An exponentially weighted moving average (EWMA) is an accurate averaging technique that can be very efficiently implemented. It is known [RED] that an EWMA can be implemented on a binary computer (e.g., part of the monitoring point hardware) using only three processor cycles and no multiplication or division for each update of the average, as long as a value of the weight 'a' is chosen that is a negative integer power of 2, i.e. $a=2^{-j}$), where j is an integer (0<a≤1). For instance the weight 'a' might be chosen to be ⅟₃₂ or ½. A smaller weight makes the moving average smoother but slower to respond to changes in the sequence of values being averaged.

The EWMA of any varying value μ can be maintained by the following well-known algorithm:

$$\bar{\mu}_i \leftarrow a\mu + (1-a)\bar{\mu}_{i-1}$$

where the next $i^{th}$ value of the moving average $\bar{\mu}_i$ is derived by taking the weighted average of the current value of the variable μ and the $(i-1)^{th}$ value of the average. The formula can be rearranged as $$\bar{\mu}_i \leftarrow \bar{\mu}_{i-1} + a(\mu - \bar{\mu}_{i-1})$$

In Pseudocode 1 (above), two EWMAs are maintained, n and e. Respectively they represent the recent rate of Neutral or Negative bytes and of Neutral or Positive bytes, both as a proportion of the rate of all three markings. It doesn't matter what they are expressed as a proportion of, as long as they are both expressed as a proportion of the same thing. This is because the values of n and e are only used relative to each other. Both EWMAs always clock on the same events (Neutral, Positive and Negative packets) to ensure that this remains so.

For the example to maintain the EWMA n, the number of bytes to average is either the packet size s when a packet is Neutral or Negative or 0 when it is Positive, therefore the code to run is:

for a Neutral or Negative packet: n=n+a*(s−n)
for a Positive packet: n=n+a*(0−n)

This explains lines 19, 23 and 25 of Pseudocode 1.

The above two lines can be implemented with the following code written in the C programming language to be compiled and pre-stored in memory (e.g., for controlling a digital processor at the monitoring point):

$$n\mathrel{+}=(s-n)\mathrel{>>}j$$

$$n\mathrel{-}=n\mathrel{>>}j,$$

where j was defined above and >> is the right bit shift operator. The first line takes only three processor cycles and the second takes only two.

In an alternative second embodiment, the relative rates of traffic with each re-ECN marking can be updated without a moving average. This is equivalent to setting the weight a of the exponentially weighted moving average formula to 1. Then lines 17 to 27 of Pseudocode 1 above could be replaced with the following extract of pseudocode.

| | | |
|---|---|---|
| 17 | switch(eecn) { | |
| 18 | case (NEUT \|\| CU): | |
| 19 | n = s | |
| 20 | e = s | |
| 22 | case (POSV \|\| CAUT): | |
| 22 | e = s | |
| 23 | n = 0 | |
| 24 | case (NEGV): | |
| 25 | n = s | |
| 26 | e = 0 | |
| 27 | } | |

However, although this embodiment reduces the required processor cycles, it may also make it easier for an attacker to manipulate the order of packet markings to his advantage. This is therefore a less-than-preferred embodiment.

In an alternative third embodiment, the relative rates n and e of traffic respectively without a Positive flag and without a Negative flag can be calculated as the reciprocal of the number of bytes since the last packet of the same marking. For instance, if n is the moving average of packets that are non-Positive (Negative and Neutral), then n' can be defined as the number of bytes since the last non-Positive packet. Similarly, e' can be defined as the gap since the last non-Negative (Positive, Cautious or Neutral) packet. Then, the same algorithm for downstream congestion can be used, except replacing n with e' and a with n', because downstream congestion, $$v=x(1-e'/n').$$

In an alternative fourth embodiment, the algorithm does not select whole packets, instead it selects bytes from packets to be considered virtually marked.

In an alternative fifth embodiment, the algorithm does not directly use an inflation factor that is " . . . the volume of all re-feedback packets relative to the volume of only those re-feedback packets that are still not congestion-marked . . . " (quoted from the explanation of Algorithm Component C of the preferred embodiment discussed earlier). Instead, the two markings that are still not congestion-marked (Neutral and Positive) are each used separately as an inflation factor, then the maximum of the two results is used. If the upstream network is not cheating, the two results should give the same correct answer. Whereas if it is trying to cheat, it can only reduce one inflation factor and the other will always necessarily increase. Therefore taking the maximum of both inflation factors removes any advantage from cheating. It then becomes in the upstream network's interest not to cheat if it wishes to minimise the amount of congestion it appears to be causing.

As a corollary, the description of algorithm component B also needs to be modified slightly from: "Then the algorithm selects this fraction from all packets with a re-feedback marking, irrespective of their specific marking." to "Then each half of the algorithm selects this fraction from all packets with specific re-feedback markings, so that the algorithm as a whole selects from all packets with re-feedback markings, taking the two halves together.

The mathematical basis of this fifth embodiment will now be derived, after recapping and extending the notation used for equation (3) above:

x is the bit-rate of all re-feedback-enabled traffic (Neutral, Positive, Negative and Cancelled)
y is the bit-rate of unmarked packets (Neutral)
u is the bit-rate of packets marked with congestion but not re-echoed congestion (Negative)
z is the bit-rate of packets marked with re-echoed congestion but not congestion (Positive)
c is the bit-rate of packets marked with re-echoed congestion and congestion (Cancelled)

From equation (3), downstream congestion rate:

$$v=x(z-u)/(z+y) \quad (3)$$

It can be seen in FIG. 2 that the bottom centre square is divided into four areas. The inflation factor $$x/(z+y)$$

used in equation (3) is the ratio of the area of the whole square x to the area of the two right-hand parts (z+y). If the square is now imagined to be cut down to the height of the lower two parts, it can be seen by proportionality that this is the same ratio as the area of the bottom two parts (c+z) to the bottom right part z. Therefore, if the re-ECN protocol is being adhered to, by proportionality:

$$x/(z+y)=(c+z)/z. \quad (5)$$

Similarly, for the top two parts of the square, again by proportionality:

$$x/(z+y)=(u+y)/y. \quad (6)$$

An upstream network trying to pervert downstream congestion measurement can vary the proportions of markings in traffic, but if the downstream network deploys a function to audit that the amount of Positive bytes is always no less than the amount of Negative bytes, the upstream network does not have complete freedom. Given such an auditing constraint, it can be shown that decreasing the inflation factor in equation (5) increases that in (6) and vice versa. Therefore, if measurements use the maximum of both factors, the lowest inflation factor will result if both factors are equal and therefore correct. Given it is in the upstream network's interest to reduce the measurement of downstream congestion, its best choice will then be to not cheat and to use the correct markings.

Therefore, the downstream network should measure downstream congestion with the following formula:

$$v=\max((z-u)(c+z)/z,(z-u)(u+y)/y) \quad (7)$$

Below we give a pseudocode algorithm that can output the result of the left-hand half of the max( ) function in equation (7). The code outputs the integral of downstream congestion-volume. It is similar to the Pseudocode 1 above in that it only uses single-cycle machine instructions (adds, subtracts, comparisons & bit-shifts) in order to minimise processing cost. Developing a similar algorithm for the right-hand half of Equation (7) would be a similar task.

The algorithm below exploits a simple trick. Rather than inflating (z−u) by (c+z)/z, it deflates (c+z) by (1−u/z), because (z−u)(c+z)/z=(1−u/z)(c+z).

Pseudocode 2: Monitoring Downstream Congestion from
Superimposed Encodings

```
1   /* Downstream congestion meter */
2   meterDownCong( ) {
3       /* Initialise variables */
4       V = 0 /* downstr congestion-volume*/
5       z = 0 /* recent Positive markings */
6       u = 0 /* recent Negative markings */
7       r = 0 /* remainder */
8       a = EWMA_WEIGHT
9       foreach packet {
10          s = readLength(packet)
11          eecn = readEECN(packet)
12          if (eecn != (ECT(0)
13                  || Not-ECT)) {
14              /* A re-ECU enabled packet */
15              /* Update moving averages dependent on pkt marking */
16              switch(eecn) {
17                  case NEGV:
18                      u += (s−u)*a
19                      z −= z*a
20                  case (POSV || CAUT):
21                      z += (s−z)*a
22                      u −= u*a
23              }
24              if (eecn == (POSV
25                      || CANC)) {
26                  if (r < z) {
27                      /* 1−u/z CANC or POSV
28                       pkts reach here */
29                      V += s
30                  } else {
31                      r −= z
32                  }
33                  r += u
34              }
35          } else {
36              /* Not a re-ECN packet */
37              /* Action depends on policy, e.g. rate limit */
38          }
39      }
40  }
```

The algorithm works broadly as that of Pseudocode 1. The assignments within the (switch (eecn) logic maintain two moving averages for recent Positive and Negative markings, z & u respectively, depending on whether the packet's extended ECN marking is Positive or Negative. As before, the values are meaningless other than relative to each other. Both EWMAs clock on the same events (a Positive or Negative mark) to ensure this is so.

The part that calculates $(1-u/z)(z+c)$ without division or multiplication is in the last two nested "if" statements (lines 24-34). Whenever a Positive or Cancelled packet arrives, it is a candidate for counting towards downstream congestion (the (z+c) term). The remainder variable r increments by u each time such a candidate appears and also decrements by z whenever it has climbed to be greater than z. Therefore, r will climb for $(1-u/z)$ of the candidates and saw-tooth down every $(u/z)$ of the candidates. It adds all the candidate packets except those picked by the downward saw-tooth to its running total of downstream congestion-volume, so it selects $(1-u/z)$ of the Positive or Cancelled packets to add.

An alternative sixth embodiment is similar to the previous fifth embodiment except, rather than taking the maximum of two formulae, one or other algorithm is chosen, possibly randomly, or possibly in another manner that varies the choice of algorithm between the two such that an attacker cannot predict or determine which will be used in any particular instance (e.g. at any particular time, or for any particular packet). Then if an attacker cheats, sometimes it will be better-off and sometimes worse-off, but it can be shown that overall, an attacker will be better off not cheating if it cannot predict which formula will be used for any particular packet. The random or otherwise varying choice between the two formulae may be made on a packet-by-packet basis, or one formula may be used for a random duration when it switches to the other.

The invention claimed is:

1. A method of determining a measure indicative of downstream path congestion in respect of a communication network intermediate node, including a digital data processor, via which a plurality of data units are traversing an end-to-end path from a communication network sender node to a communication network receiver node, each said data unit having:
    a first indication settable in dependence on information from the communication network receiver node to each of at least two states, whereby to indicate different levels of congestion experienced on the end-to-end path by data units previously received by the communication network receiver node; and
    a second indication settable to an initial state, and to at least one updated state indicative of congestion experienced by data units on their path from the communication network sender node to said communication network intermediate node;
the method comprising:
    receiving a plurality of said data units at said communication network intermediate node;
    monitoring said first and second indications in at least some of said received data units; and
    using said digital data processor to determine said downstream path congestion measure in dependence on said first and second indications and on an inflation factor, the inflation factor itself being dependent on the proportion of a set of said data units whose second indication on receipt at said communication network intermediate node is in said initial state.

2. A method according to claim 1 wherein said downstream path congestion measure is determined in dependence on the product of said inflation factor and a measure of the total bit-rate of said plurality of data units received at said communication network intermediate node.

3. A method according to claim 1 wherein said downstream path congestion measure is determined in dependence on the product of said inflation factor and a measure of the total bit-rate of said plurality of data units received at said communication network intermediate node.

4. A method according to claim 1 wherein the determination is performed using an algorithm from a set of predetermined algorithms that ensures that the downstream path congestion measure is substantially independent of the number of and/or proportion of data units having both their first indication set to indicate that the level of congestion experienced on the end-to-end path by data units previously received by the communication network receiver node was at or above a predetermined end-to-end congestion threshold and their second indication set to indicate that the level of congestion experienced by data units on their path from the communication network sender node to the communication network intermediate node was at or above a predetermined upstream congestion threshold.

5. A method according to claim 1, wherein received data units are categorized according to a plurality of predetermined categories in dependence on the state to which one or both of their first and second indications are set, and wherein said downstream path congestion measure is determined in dependence on at least two respective counts, a first of which is indicative of a measure of the volume of said data units categorized as being of a first predetermined category and a second of which is indicative of a measure of the volume of said data units categorized as being of a second predetermined category different from said first predetermined category.

6. A method according to claim 5 wherein at least one of the predetermined categories is defined such as to include data items irrespective of the state to which one of their first or second indications has been set.

7. A method according to claim 1 wherein said measure of downstream path congestion is determined according to a predetermined algorithm dependent on:
 a first measure representing the bit-rate of data units whose first indications indicate that the level of congestion experienced on the end-to-end path by data units previously received by the communication network receiver node was below a predetermined threshold; and
 a second measure representing the bit-rate of data units whose second indications indicate that the level of congestion experienced by data units on their path from the communication network sender node to said communication network intermediate node was below a predetermined threshold.

8. A method according to claim 1 wherein downstream congestion rate "v" is determined in dependence on the formula:

$$v = x(1 - n/e)$$

where:
 "x" represents the bit-rate of all data units received by said communication network intermediate node which conform to a protocol whereby said data units have a first indication settable in dependence on information from the communication network receiver node to each of at least two states whereby to indicate different levels of congestion experienced on the end-to-end path by data units previously received by the communication network receiver node, and a second indication settable to an initial state and to at least one updated state indicative of congestion experienced by data units on their path from the communication network sender node to said communication network intermediate node;
 "n" represents the bit-rate of said data units whose first indications indicate that the level of congestion experienced on the end-to-end path by data units previously received by the communication network receiver node was below a predetermined threshold; and
 "e" represents the bit-rate of said data units whose second indications indicate that the level of congestion experienced by data units on their path from the communication network sender node to said communication network intermediate node was below a predetermined threshold.

9. A method according to claim 1 wherein the inflation factor is determined in dependence on one or both of two predetermined counts chosen such that changes in the manner in which first and second indications have been set will lead to a determination of a higher downstream path congestion measure if the determination is made using an inflation factor dependent on one of said counts, and to a determination of a lower downstream path congestion measure if the determination is made using an inflation factor dependent on the other of said counts.

10. A method according to claim 9, the method comprising determining the measure of downstream path congestion using whichever of said predetermined counts provides a measure indicative of a higher amount of downstream path congestion.

11. A method according to claim 9, the method comprising determining the measure of downstream path congestion in some instances using an inflation factor determined in dependence on one of said predetermined counts and in other instances using an inflation factor determined in dependence on the other of said predetermined counts.

12. A method according to claim 1 wherein the inflation factor is determined in dependence on one or both of:
 (i) a count indicating the proportion of a set of said data units received at said communication network intermediate node whose first indication indicates that the level of congestion experienced on the end-to-end path by data units previously received by the communication network receiver node was above a predetermined end-to-end threshold and whose second indication is in said initial state; and
 (ii) a count indicating the proportion of a set of said data units received at said communication network intermediate node whose first indication indicates that the level of congestion experienced on the end-to-end path by data units previously received by the communication network receiver node was below a predetermined end-to-end threshold and whose second indication is in said initial state.

13. A method according to claim 1 wherein the first and second indications in respect of a particular data unit are settable independently of one another.

14. Apparatus arranged to perform a method according to claim 1.

15. A communication network monitoring node connected in a communication network to pass physically detectable signals representing a plurality of data units traversing an end to end network path via a communication network monitoring node from a communication network sender node to a communication network receiver node, each data unit comprising:
 a first indication settable in dependence on information from the communication network receiver node to each of at least two states, whereby to indicate different levels of congestion experienced on the end-to-end path by data units previously received by the communication network receiver node; and
 a second indication settable to an initial state, and to at least one updated state indicative of congestion experienced by data units on their path from the communication network sender node to said communication network monitoring node;
 the communication network monitoring network node comprising:
 a signal receiver connected to receive signals from said communication network representing plural data units; and
 at least one digital signal processor connected to receive data units from said signal receiver and configured to (a) monitor said first and second indications in at least some of said received data units and (b) determine a measure indicative of downstream path congestion in dependence (i) on said first and second indications and (ii) on an inflation factor, the inflation factor itself being dependent on the proportion of a set of said data units whose second indication on receipt at said communication network monitoring node is in said initial state.

16. A communication network monitoring node according to claim 15, wherein said processor is configured to determine said downstream path congestion measure in dependence on the product of said inflation factor and a measure of the total bit-rate of said plurality of data units received at said communication network monitoring node.

17. A communication network monitoring node according to claim 15, wherein said inflation factor is proportional to the reciprocal of the proportion of said set of said data units whose second indication on receipt at said communication network monitoring node is in said initial state.

18. A communication network monitoring node according to claim 15, wherein said processor is configured to perform said determination using an algorithm from a set of predetermined algorithms that ensures the downstream path congestion measure to be substantially independent of (1) the number of and/or proportion of data units having both their first indication set to indicate that the level of congestion experienced on the end-to-end path by data units previously received by the communication network receiver node was at or above a predetermined end-to-end congestion threshold and (2) their second indication set to indicate that the level of congestion experienced by data units on their path from the communication network sender node to the communication network monitoring node was at or above a predetermined upstream congestion threshold.

19. A communication network monitoring node according to claim 15, wherein said processor is configured:
  to categorized received data units according to a plurality of predetermined categories in dependence on the state to which one or both of their first and second indications are set, and
  to determine said downstream path congestion measure in dependence on at least two respective counts, a first of which is indicative of a measure of the volume of said data units categorized as being of a first predetermined category and a second of which is indicative of a measure of the volume of said data units categorized as being of a second predetermined category different from said first predetermined category.

20. A communication network monitoring node according to claim 19, wherein said processor is configured to define at least one of the predetermined categories such as to include data items irrespective of the state to which one of their first or second indications has been set.

21. A communication network monitoring node according to claim 15, wherein said processor is configured to determine measure of downstream path congestion according to a predetermined algorithm dependent on:
  a first measure representing the bit-rate of data units whose first indications indicate that the level of congestion experienced on the end-to-end path by data units previously received by the communication network receiver node was below a predetermined threshold; and
  a second measure representing the bit-rate of data units whose second indications indicate that the level of congestion experienced by data units on their path from the communication network sender node to said communication network monitoring node was below a predetermined threshold.

22. A communication network monitoring node according to claim 15, wherein said processor is configured to determine downstream congestion rate "v" in dependence on the formula:

$$v = x(1 - n/e)$$

where:
  "x" represents the bit-rate of all data units received by said communication network monitoring node which conform to a protocol whereby said data units have a first indication settable in dependence on information from the communication network receiver node to each of at least two states whereby to indicate different levels of congestion experienced on the end-to-end path by data units previously received by the communication network receiver node, and a second indication settable to an initial state and to at least one updated state indicative of congestion experienced by data units on their path from the communication network sender node to said communication network monitoring node;
  "n" represents the bit-rate of said data units whose first indications indicate that the level of congestion experienced on the end-to-end path by data units previously received by the communication network receiver node was below a predetermined threshold; and
  "e" represents the bit-rate of said data units whose second indications indicate that the level of congestion experienced by data units on their path from the communication network sender node to said communication network monitoring node was below a predetermined threshold.

23. A communication network monitoring node according to claim 15, wherein said processor is configured to determine the inflation factor in dependence on one or both of two predetermined counts chosen such that changes in the manner in which first and second indications have been set will lead to a determination of a higher downstream path congestion measure if the determination is made using an inflation factor dependent on one of said counts, and to a determination of a lower downstream path congestion measure if the determination is made using an inflation factor dependent on the other of said counts.

24. A communication network monitoring node according to claim 23, wherein said processor is configured to determine the measure of downstream path congestion using whichever of said predetermined counts provides a measure indicative of a higher amount of downstream path congestion.

25. A communication network monitoring node according to claim 15 wherein said processor is configured to determine the inflation factor in dependence on one or both of:
  (i) a count indicating the proportion of a set of said data units received at said communication network monitoring node whose first indication indicates that the level of congestion experienced on the end-to-end path by data units previously received by the communication network receiver node was above a predetermined end-to-end threshold and whose second indication is in said initial state; and
  (ii) a count indicating the proportion of a set of said data units received at said communication network monitoring node whose first indication indicates that the level of congestion experienced on the end-to-end path by data units previously received by the communication network receiver node was below a predetermined end-to-end threshold and whose second indication is in said initial state.

26. A communication network monitoring node according to claim 15 wherein said processor is configured to determine the inflation factor in dependence on one or both of:
  (i) a count indicating the proportion of a set of said data units received at said node whose first indication indicates that the level of congestion experienced on the end-to-end path by data units previously received by the receiver was above a predetermined end-to-end threshold and whose second indication is in said initial state; and
  (ii) a count indicating the proportion of a set of said data units received at said node whose first indication indicates that the level of congestion experienced on the end-to-end path by data units previously received by the receiver was below a predetermined end-to-end threshold and whose second indication is in said initial state .

27. A communication network monitoring node according to claim 15 wherein said processor is configured to set the first and second indications in respect of a particular data unit independently of one another.

\* \* \* \* \*